United States Patent [19]

Pargeter et al.

[11] Patent Number: 5,516,358

[45] Date of Patent: May 14, 1996

[54] METHOD FOR THE PRODUCTION OF IRON CARBIDE

[75] Inventors: John K. Pargeter, Voorhees, N.J.; Mark S. Mazanek, Rosemont, Pa.

[73] Assignee: Pro-Tech Reclamation, Inc., Trevose, Pa.

[21] Appl. No.: 341,497

[22] Filed: Nov. 17, 1994

[51] Int. Cl.$^6$ ................................................ C01B 31/30
[52] U.S. Cl. ........................................... 75/504; 423/439
[58] Field of Search ............................... 423/439; 75/504

[56] References Cited

U.S. PATENT DOCUMENTS

| | | | |
|---|---|---|---|
| Re. 32,247 | 9/1986 | Stephens, Jr. | 75/11 |
| 2,462,900 | 3/1949 | Riott | 75/33 |
| 3,443,931 | 5/1969 | Beggs et al. | 75/33 |
| 3,452,972 | 7/1969 | Beggs | 266/20 |
| 3,617,256 | 11/1971 | Joseph et al. | 75/36 |
| 3,770,416 | 11/1973 | Goksel | 75/25 |
| 3,870,507 | 3/1975 | Allen | 75/4 |
| 3,941,583 | 3/1976 | Martin et al. | 75/4 |
| 3,993,472 | 11/1976 | Long et al. | 75/4 |
| 3,999,981 | 12/1976 | Brandstatter | 75/416 |
| 4,256,496 | 3/1981 | Brandstatter | 423/49 |
| 4,396,423 | 8/1983 | Stephens, Jr. et al. | 75/25 |
| 4,436,551 | 3/1984 | Mori | 75/12 |
| 4,525,208 | 6/1985 | Yasukawa et al. | 75/25 |
| 4,597,564 | 7/1986 | Hanewald et al. | 266/274 |
| 4,622,905 | 11/1986 | MacDougall et al. | 110/347 |
| 4,676,741 | 6/1987 | Pargeter | 432/142 |
| 4,780,135 | 10/1988 | Pargeter | 75/25 |
| 4,836,847 | 6/1989 | Bishop et al. | 75/25 |
| 5,186,741 | 2/1993 | Kotraba et al. | 75/484 |

*Primary Examiner*—Melvyn Andrews
*Attorney, Agent, or Firm*—Buchanan Ingersoll; Michael L. Dever

[57] ABSTRACT

A method for producing iron carbide for use as an iron source in steelmaking is provided. The method can use a wide range of feedstocks without depending on natural gas by using other forms of carbon as the carburizing source. The present method accomplishes the production of iron carbide by mixing together finely divided iron oxide containing feedstocks and carbon, pelletizing the mixture, and heating the pellets to a high temperature under reducing conditions. Preferably, the pellets are heated to a temperature of at least 1100° C. Excess levels of carbon should be used in the process to assure maximum production of iron carbide.

2 Claims, No Drawings

METHOD FOR THE PRODUCTION OF IRON CARBIDE

BACKGROUND OF THE INVENTION

1. Field of the Invention

The present invention relates to a method for producing iron carbide and, more particularly, to a method for producing iron carbide from iron oxide sources such as iron ore and byproducts from metallurgical processes such as iron and steelmaking.

2. Background of the Invention

All major steelmaking processes require the input of iron bearing materials as process feedstocks. If the steelmaking method uses a basic oxygen furnace, the iron bearing materials are usually blast furnace hot metal and steel scrap. To augment scrap supplies in times of high demand and to dilute the impurities associated with scrap, steelmakers seek and use alternative iron sources in addition to conventional hot metal and scrap. The most well known and broadly used alternative iron source is a produce known as Direct Reduced Iron (DRI) which is produced by the solid state reduction of iron ore without the formation of liquid iron. DRI is produced from ore and is much purer than scrap sources of iron units. DRI is therefore valuable to the steelmaker as a means of diluting the impurities brought into the steel melt from scrap.

Direct reduction processes for making iron are a marked departure from blast furnace methods. In the direct reduction process, reduction of iron ore oxides to iron is accomplished using a mixture of hydrogen and carbon monoxide gases at temperatures of less than 1000° C. Although many direct reduction processes exist, the dominant and most successful processes are the Midrex shaft furnace method and the retort process developed by Hojalata y Lamina (the HyL Process). In both of these processes, the reducing gas mixture is produced from natural gas.

Most other DRI processes employ carbon as the reductant, usually in the form of coal. Many of these processes utilize kilns, an example being the SLRN Process or a rotary hearth furnace, as used in the INMETCO Process. For various reasons, the solid carbon reductant processes have achieved far less commercial success than the gas based processes.

The wide spread use of DRI in steelmaking has been limited by cost and availability factors. DRI production is only possible in locations with abundant sources of low cost ore and natural gas. Melting of DRI requires more time and energy than the melting of scrap. These factors limit DRI use, especially in the United states where energy costs are high and scrap is usually abundant.

In a recent development, iron carbide has been used as a source of iron for steelmaking. This development is shown in U.S. Pat. No. 4,053,301 (Reissue Patent No. 32,247); U.S. Pat. No. 5,073,194; U.S. Pat. No. 5,118,479; and U.S. Pat. No. 5,137,566. This development should have a dramatic impact on future steelmaking practice.

In this new process, iron carbide is produced from iron ore fines by contacting the iron carbide with a mixture of reducing and carburizing gases consisting of carbon monoxide, hydrogen, and hydrocarbons. The main processing unit for this reaction is a fluid bed and the input gases are sourced from natural gas. The process operating temperature is lower than that for DRI making and the process uses the gas input more efficiently. These factors represent an economic improvement over DRI production methods. However, because the process is slow, it is capital intensive.

The use of iron carbide avoids the cost penalties of energy and time that are unavoidable when using DRI in steelmaking. Iron carbide is consumed rapidly in the steelmaking furnace and the carbon contained therein is an energy source. The energy consumed in melting iron carbide is much less than for DRI and, in fact, less than the energy required for melting scrap iron.

Because the use of iron carbide in steelmaking is attractive, there is a need for a method to economically produce iron carbide. The method should avoid the drawbacks of DRI production and should provide a cost effective method of producing iron carbide that can be broadly applied without the constraints of natural gas availability. The iron carbide should be able to be formed from a wide range of iron sources which may not be suitable for treatment in a fluid-bed because of size and other limitations.

SUMMARY OF THE INVENTION

The present invention overcomes the drawbacks of the iron carbide production method described above by providing a method of iron carbide production which can use a wide range of feedstocks without depending on natural gas. The new method uses carbon as the carburizing source.

The production of iron carbide is accomplished by mixing together finely divided iron oxide containing feedstocks and carbon, pelletizing the mixture, and heating the pellets to a high temperature under reducing conditions. Preferably, the pellets are heated to a temperature of at least 1100° C. Excess levels of carbon should be used in the process to assure maximum production of iron carbide.

DETAILED DESCRIPTION OF THE PREFERRED EMBODIMENTS

In the present method, carbon is used as the carburizing source for iron carbide production. The production of iron carbide is accomplished by mixing together finely divided iron oxide containing feedstocks and carbon, pelletizing the mixture, and heating the pellets to a high temperature under reducing conditions. Preferably, the pellets are heated to a temperature of at least 1100° C. Excess levels of carbon should be used in the process to assure maximum production of iron carbide.

As the pellets are heated to temperature of 1100° C. (1948° F.) oxygen is removed from the iron oxide by the following reactions;

$$2FeO + C = 2Fe + COn \qquad (I)$$

$$CO_2 + C = 2CO \qquad (II)$$

$$FeO + CO = Fe + CO_2 \qquad (III)$$

The presence of carbon in the pellets assures the continuation of reaction (II), and the constant regeneration of carbon monoxide for continued oxygen removal as shown in reaction (III). Similar reactions take place for other oxides of iron that may be present such as $Fe_2O_3$ and $Fe_3O_4$.

The pellets should contain sufficient carbon to satisfy the above reactions. In addition, the presence of fine carbon in the pellets has the further effect of simultaneously forming iron carbide as soon as the oxygen bonds are broken. This occurs because of the mobility of the relatively small carbon atom and the rapid rate of diffusion of carbon through iron at elevated temperatures. The reaction forming iron carbide is presented below:

$$3Fe + C = Fe_3C \quad (IV)$$

In a presently preferred embodiment of the invention, the process is conducted in a rotary hearth furnace such as described in U.S. Pat. No. 4,6722,905 and U.S. Pat. No. 4,676,741. A rotary hearth furnace is an annular chamber having fixed walls and roof and a single rotating hearth. The space above the hearth is heated by suitable fuel burners firing inward through the outer and inner walls of the furnace. The process is carried out over a path extending from an entry locus at which unprocessed pellets are placed on the rotating hearth in a thin layer (e.g. three pellets deep), through a heated region, and ending in a removal locus where heat processed pellets are removed from the rotating hearth surface.

The kinetics of the reduction/carburization process can be enhanced by heating the pellets to temperatures above 1100° C. (1948° F.) or well thereabove. These temperatures are particularly beneficial in the processing of iron oxide sources such as some refractory iron ores and millscale from steel forming processes.

This higher temperature operation also favors reaction of iron carbide by causing improved reactant contact by shrinking the pellets. These higher temperatures also limit the formation of small amounts of liquid phases such as fayalite ($2FeO.SiO_2$) and olivine ($CaO.FeO.SiO_2$) which are formed from minor constituents of the iron oxide feedstock.

In another presently preferred embodiment of the invention, small amounts of carbonates are added to the oxide-carbon mixture used to form the pellets. These carbonate additions improve the kinetics of the iron carbide formation by supplying carbon dioxide as a source to promote reaction (II) above. The process can be further improved by adding up to 5% iron carbonate. However, remarkable improvements in process kinetics and carbide formation can be obtained by additions of up to 1% of sodium carbonate, potassium carbonate, or lithium carbonate. Such small amounts of sodium carbonate, potassium carbonate, and lithium carbonate, are far more effective than larger amounts of iron carbonate. Measurement of pellet and near pellet atmosphere composition indicated marked decreases in carbon dioxide content when these alkaline carbonates had been added. The alkaline metal oxides formed by the decomposition of these carbonates act as catalysts for reaction (II) above.

In another preferred embodiment of the invention, carbon is added to the feed pellets in excess of the amount required for reduction and carburization of oxides. This mode of operating the process has three major benefits. First, the presence of excess carbon favors the rate and amount of carbon monoxide reductant by reaction (II) above and the rate of carbide formation by reaction of carbon with the freed iron. Second, the presence of excess carbon allows the desired reactions to take place in the pellets independent of the atmosphere above the pellet bed in the burner firing zone of the furnace. This allows the burners to be fired for maximum heat output with complete combustion, thereby minimizing fuel input. The excess carbon in the pellets protects the newly formed iron and iron carbide from reoxidation by the high carbon dioxide furnace atmosphere.

The third and most surprising benefit of adding excess carbon to the feed pellets is a remarkable increase in carbon efficiency at increasing levels of excess carbon. Carbon efficiency is measured by considering the total amount of oxygen removed from metal oxides (MO) by the following reaction:

$$MO + C = M + CO \quad (V)$$

If the amount of carbon consumed matches the oxygen removed according to this reaction, 100% carbon efficiency is obtained. At excess carbon levels above 4%, the carbon efficiency increases rapidly to a high of 180%. This can only be explained by assuming that the excess pellet carbon reacted with carbon dioxide from the furnace atmosphere as follows:

$$CO_2 + C = 2CO \quad (VI)$$

This utilization of the furnace atmosphere almost doubled the carbon available in the pellet for reduction-carburization.

When the invention was used for the treatment of zinc and lead containing steelplant byproducts (BOF and EAF dusts), zinc and lead removal levels of over 99% were achieved together with high levels (over 95%) of iron carbide formation.

In production, pellets can be made on a pelletizing disc by mixing fine iron oxides and carbon (both minus 100 mesh) using disc rotation and applied water sprays. Although other recognized binders can be used, the addition of up to 1% of the proprietary binder "Peridur" manufactured by Dreeland Colloids Inc. is preferred. This binder is used only to improve green strength to aid in pellet handling. The mixture to be pelletized can also contain up to 1% of sodium, potassium or lithium carbonate catalyst and/or up to 10% of iron carbonate.

The pellets are formed up to 0.5" (12 mm) in diameter and layered up to three deep on the hearth of a rotary hearth furnace. The pellets are heated rapidly by air-fuel or oxy-fuel burners operating at full aeration to a temperature in excess of 1100° C. and are maintained at this temperature for up to 15 minutes before discharge. The heated pellets are discharged and pass directly to the steelmaking operation or are cooled, stored and used later.

In the foregoing specification, certain preferred practices and embodiments of this invention have been set out. However, it will be understood that the invention may be otherwise embodied within the scope of the following claims.

We claim:

1. A method for the production of iron carbide from an iron oxide source material comprising the steps of:

a) finely dividing said iron oxide source material and mixing said finely divided material with a finely divided carbon source to form a mixture of finely divided iron oxide and finely divided carbon, wherein at least one of potassium carbonate, sodium carbonate, and lithium carbonate is added to said mixture of finely divided iron oxide and finely divided carbon;

b) pelletizing said mixture of finely divided iron oxide and finely divided carbon; and c) heating said pellets under reducing conditions to form said iron carbide.

2. The method of claim 1 wherein the amount of said added at least one of potassium carbonate, sodium carbonate, and lithium carbonate is 1% of said mixture of finely divided iron oxide and finely divided carbon.

\* \* \* \* \*